(12) United States Patent
Schepperle et al.

(10) Patent No.: US 7,188,432 B2
(45) Date of Patent: Mar. 13, 2007

(54) CORRECTION OF THE TEMPERATURE ERROR DURING A MEASUREMENT CONDUCTED BY A COORDINATE MEASURING DEVICE

(75) Inventors: Karl Schepperle, Oberkochen (DE); Wolfgang Wiedmann, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 10/486,767

(22) PCT Filed: Aug. 6, 2002

(86) PCT No.: PCT/EP02/08775

§ 371 (c)(1),
(2), (4) Date: Aug. 18, 2004

(87) PCT Pub. No.: WO03/014655

PCT Pub. Date: Feb. 20, 2003

(65) Prior Publication Data

US 2005/0000105 A1   Jan. 6, 2005

(30) Foreign Application Priority Data

Aug. 9, 2001   (DE) .............................. 101 38 138

(51) Int. Cl.
   *G01B 21/04*   (2006.01)
   *G01D 3/28*   (2006.01)
(52) U.S. Cl. .......................................... 33/702; 33/503
(58) Field of Classification Search .................. 33/502, 33/503, 702, 703, 704; 700/193; 702/152
   See application file for complete search history.

(56) References Cited

U.S. PATENT DOCUMENTS

| 4,637,119 A |   | 1/1987 | Schneider et al. |
| 5,014,444 A | * | 5/1991 | Breyer ........................ 33/702 |
| 5,408,758 A | * | 4/1995 | Mizutani et al. .............. 33/702 |
| 5,513,113 A | * | 4/1996 | Okada et al. ................ 700/179 |
| 5,949,685 A | * | 9/1999 | Greenwood et al. ........ 700/193 |
| 6,167,634 B1 |   | 1/2001 | Pahk et al. |
| 6,178,389 B1 | * | 1/2001 | Sola et al. ................... 702/152 |
| 6,269,284 B1 | * | 7/2001 | Lau et al. .................... 700/193 |
| 6,487,787 B1 | * | 12/2002 | Nahum et al. ................ 33/706 |
| 6,671,650 B2 | * | 12/2003 | Ogura et al. ................. 702/152 |
| 6,701,633 B2 | * | 3/2004 | Ohtsuka ....................... 33/552 |
| 6,704,684 B2 | * | 3/2004 | Beck ........................... 702/152 |
| 6,941,669 B2 | * | 9/2005 | Shivaswamy et al. ........ 33/502 |

FOREIGN PATENT DOCUMENTS

| DE | 36 31 825 A1 |   | 3/1988 |
| DE | 88 13 875 U1 |   | 12/1988 |
| DE | 10138138 A1 | * | 2/2003 |
| EP | 1 128 156 A |   | 8/2001 |
| GB | 2 227 563 A |   | 8/1990 |

* cited by examiner

*Primary Examiner*—R. Alexander Smith
(74) *Attorney, Agent, or Firm*—Buchanan, Ingersoll & Rooney

(57) ABSTRACT

The discovered temperature of the feeler is regularly determined and is recorded together with the associated calibrating data at this temperature. Temperature correction data for the feeler are established from this historic collection consisting of temperature values and of calibrating data. This temperature correction data can be used during a measurement at the respective temperature. This method avoids a separate and complicated setting of the temperature of the feeler or of the entire coordinate measuring device for the calibration.

4 Claims, 2 Drawing Sheets

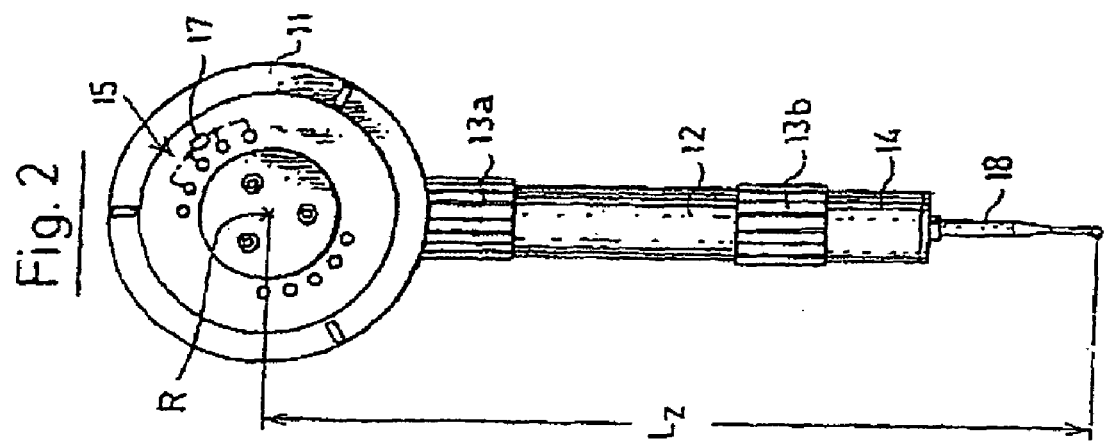
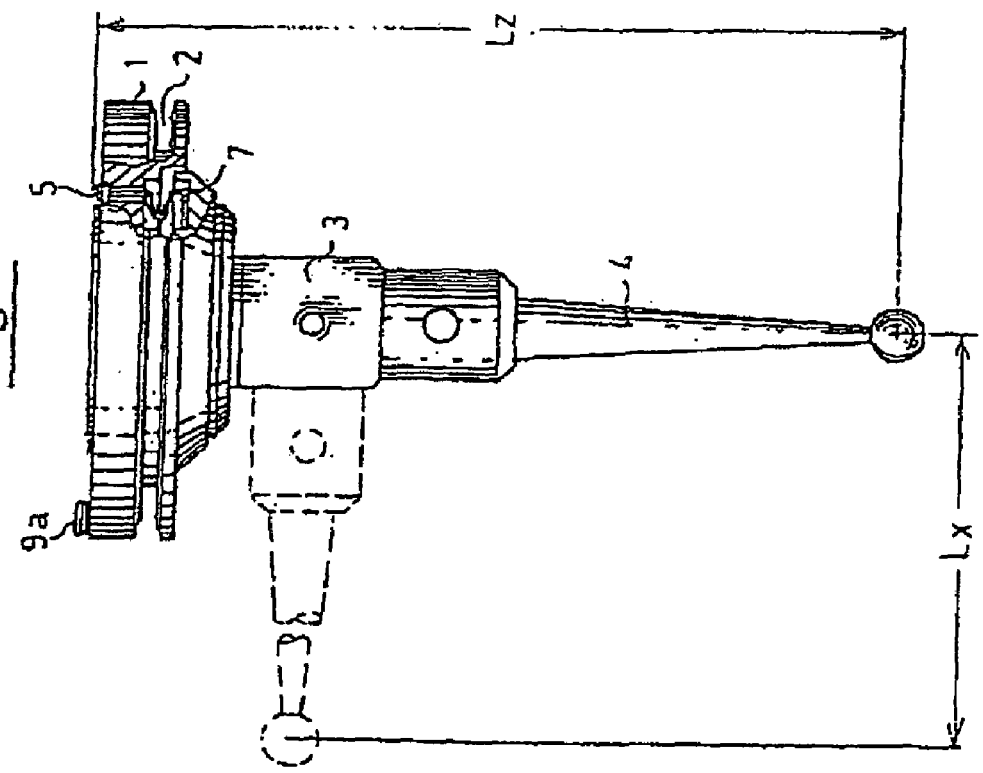

CORRECTION OF THE TEMPERATURE ERROR DURING A MEASUREMENT CONDUCTED BY A COORDINATE MEASURING DEVICE

This application is a national phase of PCT/EP02/08775, which was filed Aug. 6, 2002, and International Application No. DE 101 38 138.7, which was filed on Aug. 9, 2001, and was not published in English.

Coordinate measuring machines (CMMs) play a central role in the quality control of fabricated components.

When a coordinate measuring machine is used to make measurements outside climate-controlled rooms or cabinets, the probes of the coordinate measuring machine must then continually be recalibrated in relatively short time intervals. The point is that even slight deviations from the reference temperature of which a calibration carried out once was undertaken lead to measuring errors because of the thermal linear expansion of the probes. An aluminum probe with a length of 100 mm expands by 2.5 µm, for example, in the case of a temperature increase of 1.1° C. This error can already exceed the permissible measurement uncertainty of the coordinate measuring machine used.

Since a plurality of different probes are exchanged one after another as a rule during a measuring operation for a complete workpiece, and these feelers are taken either from a storage cupboard or a magazine installed at the edge of the measuring area, it follows that their temperature can have changed in the meantime. Accordingly, there would be a need to calibrate anew after each change of probe, in order to obtain accurate measurements. This slows down the overall measuring cycle, and is disadvantageous particularly in the fabrication area, where quick measurement results are required.

The above named difficulties can be circumvented by fabricating the probes from materials with low thermal expansion coefficients such as, for example, Invar. Also known are feelers (see DE 297 04 636) that consist of at least two materials of which one has a positive, and one has a negative thermal expansion coefficient. The effective length of the feeler, and the thermal expansion coefficients and/or the materials are selected in such a way that the length of the feeler scarcely changes with temperature. One possible combination of materials is carbon-fiber-reinforced plastic (CFRP) with a negative thermal expansion coefficient, together with steel, aluminum and/or possibly ceramic material. Feelers made from these materials are, however, complicated to produce. It is therefore not possible to switch the probes to these materials straightaway.

A further method for reducing temperature influences in the case of coordinate measuring machines is described in DE 36 31 825. In the method described, the required temperatures and/or correction data records are determined at a plurality of different temperatures and stored in the computer of the coordinate measuring machine. The coordinate measuring machine is surrounded by a thermally insulating cabinet for temperature stabilization. Temperature-stabilized air is blown into the cabinet. The temperature of the air blown in is measured and used to select the currently required correction data record.

It is simplest when the thermal linear expansion is permitted and the measurement results are subsequently corrected with the aid of the temperature values and correspondingly determined correction data.

It is an object of the invention further to simplify the temperature correction of measurements with the aid of coordinate measurement machines.

This object is achieved by means of the inventions in accordance with the independent claims. Advantageous developments of the inventions are characterized in the subclaims.

According to the invention, the temperature found for at least one part of the coordinate measuring machine is firstly determined and recorded, and calibration data of the at least one part of the coordinate measuring machine are determined and recorded in association therewith at the temperature found. The temperature found is in this case a temperature that was encountered without a targeted setting, for example in a temperature-stabilizing cabinet. Such a temperature is found, for example, early in the morning at the start of work or in the further course of the day. A CMM is naturally stabilized to the temperature of the room in which it is located.

Calibration data are understood to be data on length or rotation, in general the geometry of a part of the coordinate measuring machine. The calibration data reproduce the deviation from the reference point in the form of a vector. They can be calculated from the recorded machine coordinates.

The parts of the CMM considered can be, for example, the stands, the arms, the quills or the rotating/pivoting joint, the probe head or the feelers, in each case alone or in combination.

The above named step is repeated at least once. In the case of the repetition carried out at a later instant, the new temperature found at the later instant is recorded together with the associated calibration data. This produces a quasi-historical collection of different temperatures and associated calibration data. For example, temperatures and calibration data are determined every morning during the initial calibration of the coordinate measuring machine.

Temperature correction data for the at least one part of the coordinate measuring machine are determined from the recorded temperatures and associated calibration data. This can involve a simple linear compensation with the aid of the thermal expansion coefficient determined from the data ascertained. A nonlinear compensation is also equally well possible, for example, by fitting polynomials. Also conceivable is a multidimensional fitting, for example for the purpose of describing twists that can be caused by asymmetries in the probe head. Such twists can be described by a combination of rotation matrices and rotation operators (multiplications, possibly in conjunction with translations). These data can be used, for example, to correct the length scales of the CMM, the length of the arms of a CMM, for example of a stand CMM, or the dimensions of the probe head or feeler.

During the actual carrying out of a measurement with the aid of a coordinate measuring machine, the temperature, encountered during the measurement, of the at least one part of the coordinate measuring machine is determined. During the operation, the measurement of the temperature can be carried out immediately before or immediately thereafter, but in any case so close by in time that it is possible to deduce the temperature of the part of the coordinate measuring machine at the instant of the length measurement.

The temperature can be measured in at least three ways in this case. Firstly, it can be measured at the workpiece. Since it is actually the temperature of a part of the coordinate measuring machine that is to be determined, it is rather inaccurate to determine the temperature of the workpiece from which the aim is to deduce the temperature of the part of the coordinate measuring machine. The temperature of the workpiece and the temperature of the part of the coordinate measuring machine need not coincide. Secondly, the temperature can be measured in the vicinity of the part of the coordinate measuring machine, and thirdly the temperature can be measured at the part of the coordinate measuring machine itself. The latter is clearly the most exact method.

Suitable temperature correction data for the at least one part of the coordinate measuring machine can be determined from the stored correction data on the basis of the temperature, determined during measurement, of the at least one part of the coordinate measuring machine.

The method according to the invention can be used in general for temperature corrections. It can scarcely be outdone in its simplicity. In particular, it requires no separate temperature stabilization of the CMM, for example in a cabinet. The state of affairs for the temperature correction is derived from the empirically observed and recorded measurement history. The natural temperature fluctuations in a laboratory between summer and winter and on the basis of other influences such as weather, heating, etc., are utilized and logged in this case.

The method according to the invention is preferably applied to a feeler or to a feeler combination. It is particularly advantageous when a coordinate measuring machine is used that is completely thermally corrected up to the zero point or reference point R (see FIG. 2) of the feeler. It is then only the temperature correction of the feeler that still remains, and this can be carried out in accordance with the invention.

In order to increase the accuracy further, the temperature correction data can be determined individually for each individual feeler and used in a targeted fashion only for this feeler. In the case of a feeler combination, the method according to the invention can be applied individually to each feeler of the feeler combination.

The temperature of a feeler can be performed in a simple way by determining the temperature at the holder plate of the feeler (see below). Measuring the temperature in the vicinity of the middle of the feeler would be optimal.

The temperature of the exchanged feeler combination is measured after each change of feeler, for example. The linear expansion to be corrected is calculated from the difference relating to the temperature at which the relevant feeler combination has been calibrated (reference temperature, see below), and taking account of the feeler lengths (LX or LZ, that is to say the length in the x- or z-direction, see FIG. 1 and FIG. 2), as well as the expansion coefficient, inferred from the measurement history, of the probe material (temperature correction data). This holds for the linear case in which the exchanged feeler combination expands homogeneously and without twists in all axial directions.

The correction of the thermal linear expansion of the feeler is performed by multiplying the distance of the midpoint of the probe ball at the feeler from the reference point, to be taken into account for the correction, at the holder plate by the thermal expansion coefficient and the difference between the measured temperature and that temperature at which this probe configuration was calibrated, that is to say the reference temperature.

Expressed in mathematical formulas, the following results: let $L_T$ be the distance of the midpoint of the probe ball at the feeler from the reference point, to be taken into account for the correction, at the holder plate at the temperature T, and let $L_0$ be the same length at a reference temperature $T_0$ of, for example, 20° C. The length $L_T$ is then given—in a linear approximation—by:

$$L_T = L_0 \cdot (1 + \alpha \cdot \Delta T)$$

Here, $\alpha$ is the linear thermal expansion coefficient. It results in the simplest case from two measurements 1 and 2, which were carried out at two temperatures $T_1$ and $T_2$, and two lengths $L_1$ and $L_2$ were yielded as:

$$\alpha = \left(\frac{L_1}{L_2} - 1\right) / (T_1 - T_2)$$

$\Delta T$ is the difference between the measured temperature T and the reference temperature $T_0$:

$$\Delta T = T - T_0$$

The result for the correction $\Delta L$ of the length is then obtained as $$\Delta L = L_r - L_0 = L_0 \cdot (1 + \alpha \cdot \Delta T) - L_0 = L_0 \cdot \alpha \cdot \Delta T$$

that is to say precisely as described.

It is particularly advantageous when the temperatures and calibration data obtained from the measurement history are weighted in order to determine the temperature correction data or the thermal expansion coefficient in accordance with the difference between the temperature associated with the calibration data and a reference temperature. The weight is to be greater the greater the temperature difference. Consequently, a high precision is quickly achieved in determining the thermal deformation or the thermal expansion coefficient.

The temperature correction data can be adaptively improved if the temperature and the calibration data are determined with each new calibration. It is possible in this way to determine temperature correction data of adequate practical accuracy over a relatively short time period. Given continuous recording, for example each morning, it is also possible to take account of creeping changes in the feeler or in another observed part of the CMM, for example by using only temperature and calibration data of the last year (or another sensible time period) to determine the correction data.

The method according to the invention can advantageously be integrated into existing coordinate measuring machines, preferably in the form of a control program running on that computer which controls the coordinate measuring machine in any case.

The invention is explained in more detail below with the aid of exemplary embodiments that are schematically illustrated in the figures. Identical reference numerals in the individual figures denote identical elements in this case. In detail:

FIG. 1 shows an exchangeable feeler in side view;

FIG. 2 shows an exchangeable probe head in a view onto the changing surface.

Figure 3:
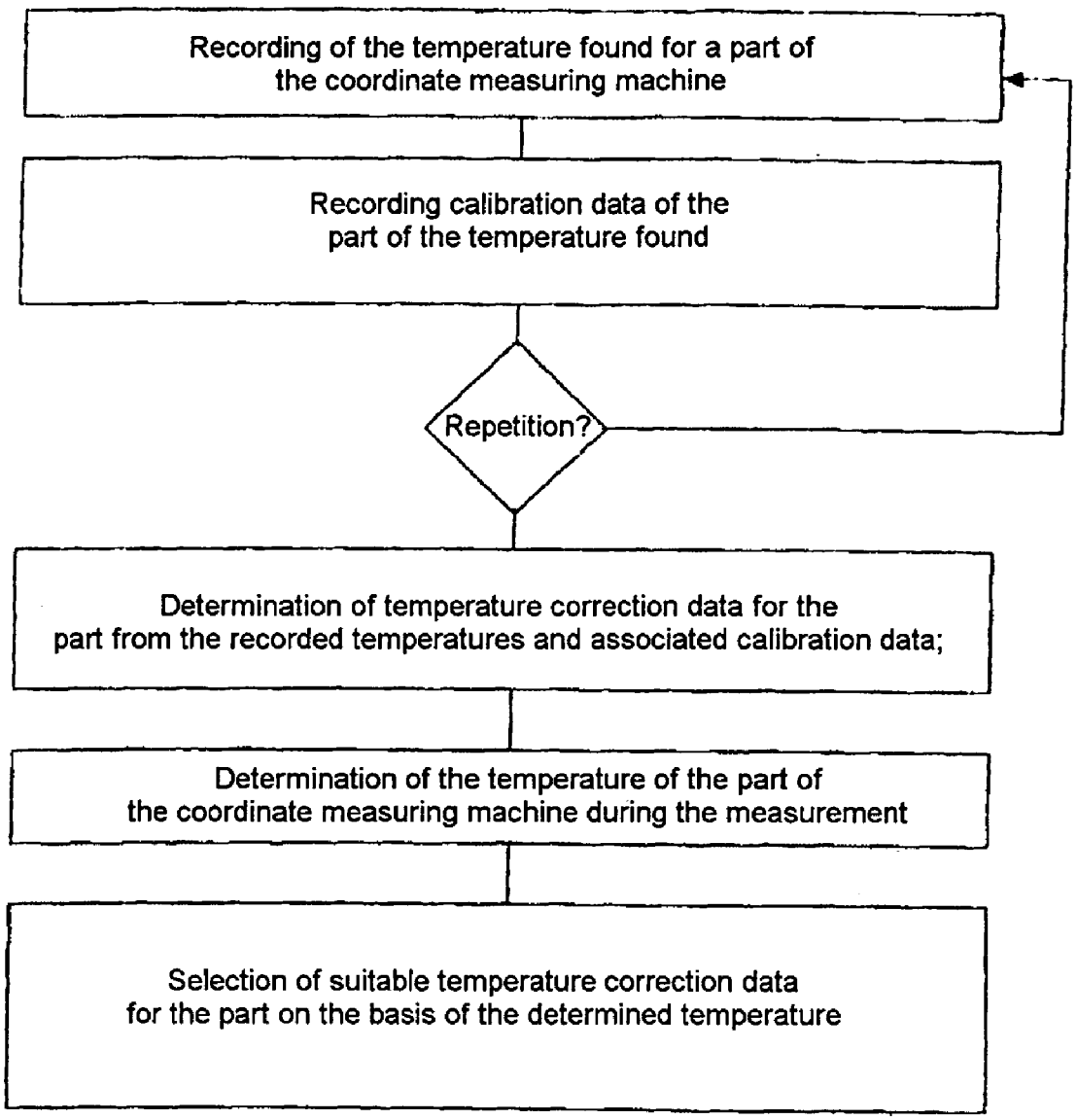
FIG. 3 shows a flowchart of the method according to the invention.

Illustrated in FIG. 1 is a feeler that can be exchanged, for example via the changing device described in U.S. Pat. No. 4,637,119, automatically from a magazine constructed at the edge of the measuring area of the relevant coordinate measuring machine. For this purpose, a changing plate 1 is provided on the topside of which three cylindrical bodies are arranged offset by 120°. Using these cylindrical bodies, of which only one cylindrical body, the cylindrical body 9a, is to be seen in the illustration according to FIG. 1, the changing plate 1 is reproducibly applied to a corresponding bearing block on the underside of the probe head at the coordinate measuring machine.

The changing plate 1 bears at its underside a mounting cube 3 onto which up to five feelers or feeler combinations can be screwed in a fashion projecting to all sides. In the illustration shown in FIG. 1 only one feeler 4 is attached to the underside of the mounting cube 3.

The plate-shaped holder 1 is provided, furthermore, with a circumferential slot 2. Engaging in this slot is a fork-shaped carrier of the magazine (not shown) into which the probe is deposited.

The temperature sensor for determining the temperature of the feeler 4 should be in good thermal contact with the feeler. For example, it can be integrated into the feeler (see DE 88 13 875 U1). When the probe head and the feeler consist of a material of good thermal conductivity such as, for example, steel or aluminum, it can suffice to insert the sensor into the holder plate, which serves to fasten the feeler. Because of the thermal conductivity, the complete unit to be exchanged, consisting of holder and feeler, quickly assumes the temperature of the probe head, and a temperature equalization quickly results.

In the preferred exemplary embodiment shown in FIG. 1, the temperature sensor is integrated into the holder 1. It is seen in the broken-open illustration of FIG. 1 that a sensor 7, preferably in the form of a platinum resistor, is inserted into the plate-shaped holder 1. This sensor 7 is in good thermal contact with the feeler 4 as well as with the remaining feelers that can be attached to the mounting cube 3, because of the good thermal conductivity of the metallic material from which the parts 1, 3 and 4 are produced.

The ends of the measuring resistor 7 are laid against contact pins 5 at the topside of the changing plate 1. The voltage dropping across the measuring resistor is transferred in this way to corresponding mating contacts in the probe head. The transmitted voltage is evaluated by a downstream electronic measuring unit (not shown).

It is possible thereby for feelers that have once been calibrated to be used under changing ambient temperatures. Since the sensors are continually in thermal contact with the probe, they pick up the temperature thereof highly accurately. The probe temperature can therefore be indicated without a time delay in fractions of a second.

In the exemplary embodiment in accordance with FIG. 2, the complete probe head 14 with the feeler 18 mounted compliantly therein is fastened via an extension piece 12 on the plate-shaped holder 11, which bears the changing surface for automatic exchange at the measuring arm of a coordinate measuring machine. The housing of the probe head 14, the extension 12 and the changing plate 11 as well as the union nuts 13a, 13b connecting the parts to one another consist of aluminum, and are at the same temperature—because of the good thermal conductivity of the material.

A temperature sensor 17 (not visible in the plan view in accordance with FIG. 2) is integrated into the changing plate 11 in a way similar to the exemplary embodiment in accordance with FIG. 1. The temperature sensor 17 is also a measuring resistor, which is preferably operated using four-wire technology. Its terminals are connected for this purpose to four contact pins 15, visible in the plan view in accordance with FIG. 2, of the changing plate.

The temperatures of other components of a coordinate measuring machine such as, for example, those of the scales, can already be detected using temperature sensors that operate with four-wire technology. The outlay on circuitry can therefore be kept low, since the temperatures of the various measuring points (scale, workpiece, feeler) can be indicated and evaluated by a processor in multiplex operation.

| List of reference numerals | |
|---|---|
| 1 | Changing plate (plate-shaped holder) |
| 2 | Circumferential slot |
| 3 | Mounting cube |
| 4 | Feeler |
| 5 | Contact pins |
| 7 | Sensor (measuring resistor) |
| 9a | Cylindrical body |
| 11 | Changing plate (plate-shaped holder) |
| 12 | Extension piece |
| 13a, 13b | Union nuts |
| 14 | Probe head |
| 15 | Contact pins |
| 17 | Sensor (measuring resistor) |
| 18 | Feeler |
| LX | Feeler length in x-direction |
| LZ | Feeler length in z-direction |
| R | Reference point |

The invention claimed is:

1. A method for correcting for temperature error occurring during a measurement made using a coordinate measuring machine, comprising the steps of:
   a) determining and recording at a particular time the temperature of at least one part of the coordinate measuring machine including a feeler or combination of feelers, and at the same time determining and recording calibration data therefor, the calibration data being calculated from machine coordinates;
   b) repeating step a) at at least one later instant, and recording the new temperature and associated calibration data;
   c) determining and recording temperature correction data for each new temperature using the previously recorded temperatures and associated calibration data;
   d) during a subsequent measurement made using the coordinate measuring machine, determining the then present temperature of the at least one part of the coordinate measuring machine; and
   e) selecting and using the previously recorded temperature correction data corresponding to the then present temperature of the at least one part of the coordinate measuring machine, determined during the subsequent measurement, to correct for temperature error.

2. The method as recited in claim 1, wherein the temperature correction data are determined individually for each individual feeler.

3. The method as recited in claim 1, wherein the determined calibration data are weighted during the determination of the temperature correction data in accordance with the difference between the temperature associated with the calibration data and a reference temperature.

4. A coordinate measuring machine comprising:
   means for determining and recording the temperature of at least one part of the coordinate measuring machine, the one part including at least one feeler or combination of feelers;
   means for determining and recording calibration data for the at least one part of the coordinate measuring machine at the recorded temperature;
   means for calculating the calibration data from machine coordinates;
   means for repeating at least once the determination of temperature and calibration data at a later instant, and for recording the newly determined temperature and associated calibration data;

means for determining and recording temperature correction data for the at least one part of the coordinate measuring machine at each new temperature using previously recorded temperatures and associated calibration data;

means for determining the temperature of the at least one part of the coordinate measuring machine during a subsequent measurement; and means for selecting and applying to the coordinate measuring machine temperature correction data corresponding to the at least one part of the coordinate measuring machine on the basis of the temperature thereof determined during the subsequent measurement.

* * * * *